United States Patent [19]

Girard

[11] 3,748,434
[45] July 24, 1973

[54] COMPOSITE CONSUMABLE WIRE GUIDE ELECTRODE

[75] Inventor: Dean C. Girard, Berkeley, Calif.

[73] Assignees: Guide Tube Inc., Richmond; Jean LaForce, Inverness, both of Calif.; part interest to each

[22] Filed: May 27, 1971

[21] Appl. No.: 147,896

[52] U.S. Cl. .................. 219/146, 219/73, 219/126
[51] Int. Cl. ............................................. B23k 35/00
[58] Field of Search .................. 219/146, 145, 137, 219/136, 126, 76, 73

[56] References Cited
UNITED STATES PATENTS

| 3,102,827 | 9/1963 | Kriewall et al. ............... 117/204 |
| 2,552,176 | 5/1951 | Hummitzsch ................. 219/146 |
| 3,260,834 | 7/1966 | Arnoldy ........................ 219/73 |
| 3,118,053 | 1/1964 | Arikawa et al. .............. 219/146 |
| 3,352,993 | 11/1967 | Suzuki et al. ................. 219/73 |
| 3,558,845 | 1/1971 | Norcross ....................... 219/73 |
| 3,531,620 | 9/1970 | Arikawa et al. .............. 219/146 |
| 2,191,471 | 2/1940 | Hopkins ........................ 219/76 |
| 2,024,992 | 12/1935 | Wissler et al. .............. 219/76 X |

Primary Examiner—J. V. Truhe
Assistant Examiner—George A. Montanye
Attorney—Harris Zimmerman

[57] ABSTRACT

A consumable wire guide electrode for producing a high alloying effect on the weld deposit includes spaced inner and outer tubes defining a void therebetween filled with an alloying material and binder, the bore of the inner tube serving as a guide for the feed of a continuous wire electrode therethrough. The outer tube is advantageously exteriorly coated with flux such that as the wire and guide are consumed by an electric arc, a pool of alloyed weld metal with flux floating on the top is produced.

13 Claims, 6 Drawing Figures

PATENTED JUL 24 1973 3,748,434
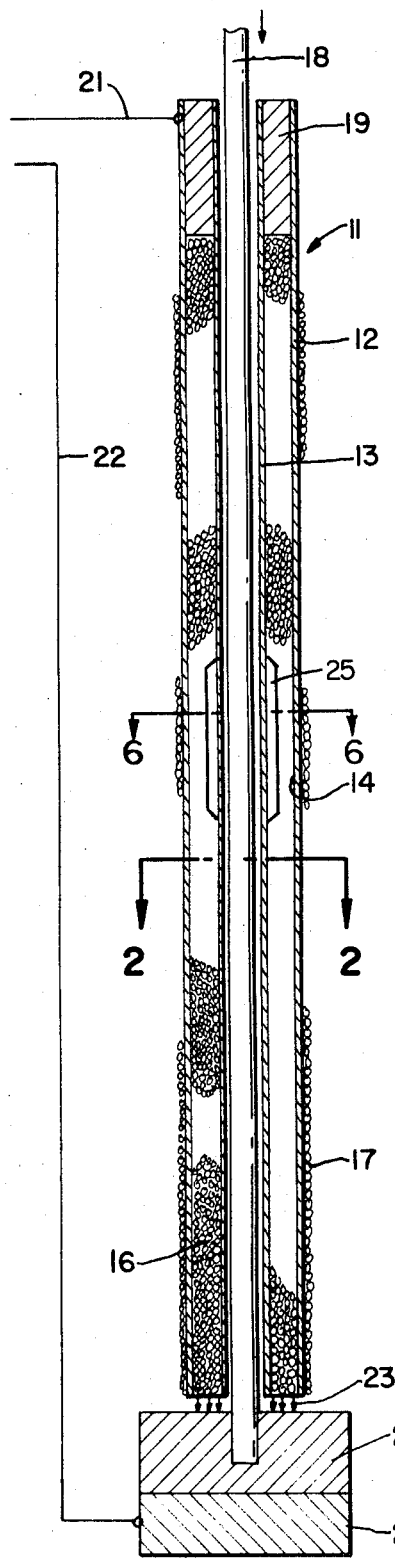
FIG_1
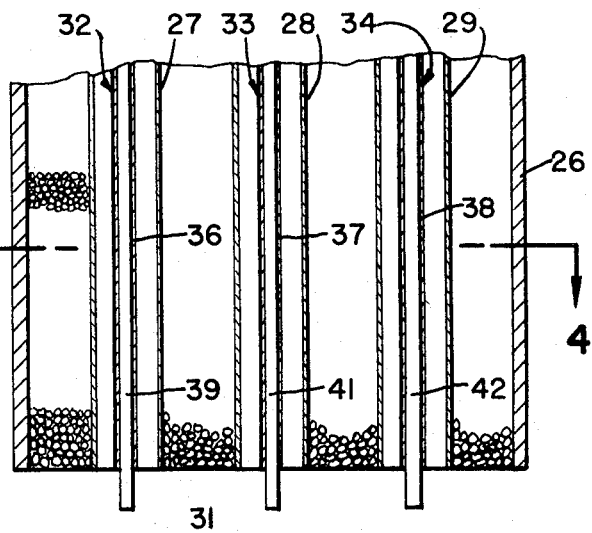
FIG_3
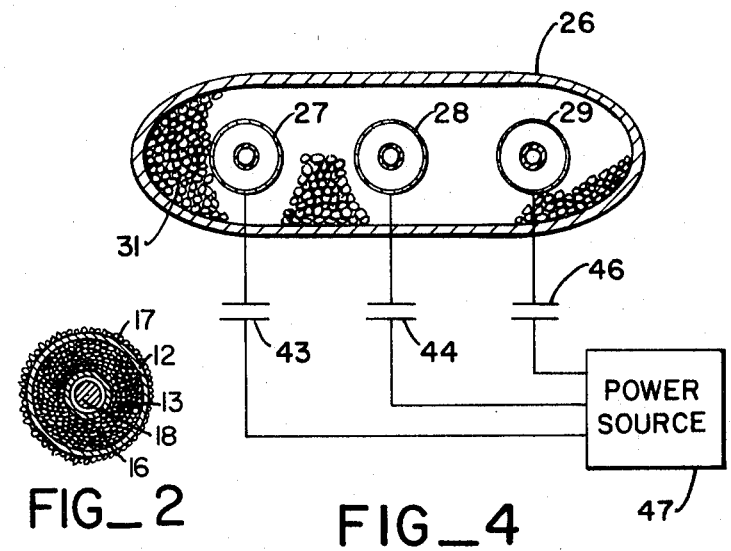
FIG_4
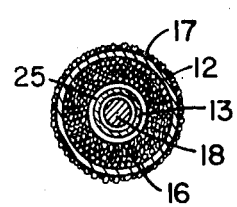
FIG_2
FIG_6
FIG_5
INVENTOR.
DEAN C. GIRARD
BY
Harris Zimmerman
ATTORNEY

3,748,434

COMPOSITE CONSUMABLE WIRE GUIDE ELECTRODE

BACKGROUND OF THE INVENTION

In present arc welding practice, a consumable tubular metal rod extenally coated with flux is typically employed as a guide for the feeding of a consumable continuous wire electrode therethrough. The guide tube and wire electrode combination is connected to one potential side of a welding circuit, the other side being connected to a work piece having a cavity to be filled with weld metal. The guide is positioned mechanically over the cavity in a vertical position such that an electrical arc is struck between the wire electrode and work piece. The wire and guide are consumed by the arc such that as the wire is fed through the guide it is coated with flux at a uniform rate and the cavity is filled with molten weld metal with a layer of flux floating on top. Such conventional wire guide electrodes are limited, insofar as the production of an alloying effect on the weld deposit is concerned, to the use of a guide tube of low alloy or carbon steel. The alloying effect thereby produced is of low order.

SUMMARY OF THE INVENTION

The present invention relates generally to consumable wire guide electrodes, and is more particularly directed to such an electrode which is arranged to produce a high alloying effect on the resulting weld deposit.

It is an object of the present invention to provide a composite consumable wire guide electrode wherein consumable alloying material is self-contained for alloying interaction with a consumable continuous wire electrode fed through the guide electrode during the arc welding process to thereby produce a weld deposit with a high alloying effect.

Another object of the invention is the provision of a high alloying effect guide electrode of the class described wherein flux or a consumable insulating material may by readily self-contained to provide a layer thereof on the alloyed weld deposit during consumption of the guide and wire electrodes in the electric arc.

Yet another object of the invention is to provide a high alloying effect guide electrode which may be arranged to provide distributed potentials and currents in the electrical arc to suit characteristics of the work piece to which the weld is deposited.

It is a further and more specific object of the invention to provide a composite consumable wire guide electrode including an outer tube, at least one inner tube disposed within the outer tube in spaced relation to define a void therebetween, and alloying material and binder filling the void, the bore of each inner tube serving as a guide for a consumable continuous wire electrode. The outer tube may be externally coated with flux, or the like, and the wire fed through the bore of each inner tube may be solid or of composite tubular configuration including alloying material and binder in the bore thereof to provide maximum alloying effect in the weld alloy.

BRIEF DESCRIPTION OF THE DRAWING

FIG. 1 is a sectional view taken at a diametric plane through a composite high alloying effect consumable wire guide electrode in accordance with the present invention;

FIG. 2 is a sectional view taken at line 2—2 of FIG. 1;

FIG. 3 is a fragmentary sectional view similar to FIG. 1 of a modified form of guide electrode;

FIG. 4 is a sectional view taken at line 4—4 of FIG. 3; and

FIG. 5 is a cross-sectional view similar to FIG. 2 showing a modified form of the invention;

FIG. 6 is a sectional view taken at line 6—6 of FIG. 1.

DETAILED DESCRIPTION OF THE INVENTION

Referring now to the drawing in detail, FIGS. 1 and 2 in particular, there is shown a composite high alloying effect consumable wire guide electrode 11, in accordance with the present invention, which comprises an outer tube 12, an inner tube 13 disposed within the outer tube in spaced relation to define a void 14 therebetween an alloying material and binder composition 16 filling the void, the binder serving to hold the alloying material in place within the void. In the embodiment of FIGS. 1 and 2, the inner and outer tubes are of circular cross section and concentrically disposed in radially spaced relationship such that the void is annular. The tubes are metallic and the composition 16 is of granular alloy material dispersed in an organic or inorganic binder. The exterior of outer tube 12 is preferably coated with flux, as indicated at 17; however, in some instances a coating of insulating material such as asbestos may be alternatively employed, or the coating may be dispensed with. The bore of the inner tube 13 serves as a guide for the feed of a consumable continuous wire electrode 18 of weld material therethrough. In the initial construction of the guide electrode 11, the inner tube 13 preferably projects longitudinally beyond the outer tube 12, for the purpose of assisting in the initial striking of an electrical arc between the electrode and a work piece. An annular metal plug 19 is preferably interposed between the inner and outer tubes at their upper ends to provide a positive electrical connection therebetween.

With the guide electrode 11 provided in the manner described above, such electrode is supported in vertical position above a work piece 20, and the electrode and work piece are connected to opposite leads 21 and 22 of an arc welder power supply. An electrical arc 23 is thereby established between the lower portions of the guide and wire electrodes 11 and 18 and the work piece. The arc consumes the wire electrode 18 as it is fed through the guide electrode 11 and simultaneously consumes the lower portions of the outer and inner tubes 12 and 13, alloying material composition 16, and flux coating 17 adjacent the arc. The alloying material interacts with the weld material of the wire electrode to thereby produce a pool 24 of highly alloyed weld material at the work piece 20 with a layer of flux floating on the top. The flux protects the weld from the ionized atmosphere in the vacinity of the arc. Where an insulating material is employed as the coating 17, it enters the pool and floats on its top surface to prevent arcing between the weld and work piece. Although the entire guide electrode 11 and the wire electrode 18 are maintained at the same arc welding potential in the presently described embodiment, it is to be noted that in some instances it is desirable that the inner tube 13 be insulated from the remainder of the guide electrode, for example by means of glass tape 25 wrapped around the exterior of the inner tube, as illustrated in FIG. 6. The lead 21 is then connected to the inner tube such that only this tube is maintained at arc welding potential and a variation in arc distribution is obtained.

Referring now to FIGS. 3 and 4, a modified form of the guide electrode is illustrated which includes an outer tube 26 of elliptical cross section and a plurality of inner tubes 27,28 and 29 of circular cross section disposed within the outer tube in spaced relation thereto. The void thus defined between the outer and inner tubes is filled with alloying material and binder composition 31 as in the case of the embodiment of FIGS. 1 and 2. The outer tube 26 is not illustrated as having an exterior coating of flux, however in some instances such a coating may be included. A plurality of consumable continuous wire electrodes 32,33 and 34 are fed through the bores of the inner tubes 27, 28 and 29. Although the wire electrodes may be of solid cross section, some are advantageously of composite configuration including tubes 36, 37 and 38 with the bores thereof filled with alloying material and binder composition as indicated at 39, 41 and 42. The composite wire electrodes in conjunction with the composite guide electrode produce maximum alloying effect in the deposited weld. The entire assembly of guide electrode and plurality of wire electrodes may be maintained at the same welding potential, in which case the inner tubes are not insulated from the remainder of the guide electrode. However, advantages are to be gained by maintaining the respective wire electrodes at different potentials productive of different amperage in the portions of the arc emanating therefrom. In such an arrangement the inner tubes 27, 28 and 29 are exteriorly wrapped with glass tape, or the like, to insulate same from the remainder of the guide electrode. The inner tubes are then separately coupled, as by means of capacitors 43, 44 and 46, to separate terminals of a power source 47 arranged to provide separate voltage and amperage values in the arc. In this manner the arc ditribution may be tailored to the characteristics of the work piece to which the weld deposit is applied, and the flow of electrical energy such as to enhance the maintanence of a molten pool of weld material.

In FIG. 5, there is shown a modified form of the invention from that shown in FIGS. 1 and 2. In this embodiment, the outer tube is eliminated and the inner tube 13 is effectively provided with an outer "tube" by electro-chemical depositing of scintered metal in the form of a layer or coating 50 around tube 13. The coating should be incipient fused in order to obtain an appropriate conductive assembly. Any suitable conductive metal or alloy may be applied to the tube surface using conventional scintering techniques.

I claim:

1. In an arc welding system having a power supply and a consumable guide tube having a welding wire fed therethrough, the improvement in said consumable guide tube comprising: an outer electrically conductive metal tube electrically connected to said power supply, at least one electrically conductive metal inner tube disposed within said outer tube in spaced relation thereto and electrically connected to said power supply, means for maintaining said spaced relation between said outer and inner tubes for defining an annular void therebetween, and an alloying material dispersed in a binder composition disposed within said void, said inner tube having a freely open bore defining a guide means for the feed of a consumable continuous wire guide electrode therethrough, said inner and outer tubes and said alloying material all being of material consumable during arc welding and depositable on and in the weld melt.

2. A system according to claim 1, further defined by said outer tube being exteriorly coated with consumable flux material.

3. A system according to claim 1, further defined by said outer tube being exteriorly coated with asbestos material.

4. A system according to claim 1, further defined by said outer tube being of circular cross section, said inner tube being of circular cross section concentrically disposed within said outer tube in spaced relation to define the void.

5. A system according to claim 1, further defined by electrically conductive metallic plug means disposed between said outer tube and each inner tube adjacent one end thereof to electrically interconnect said outer tube to each inner tube.

6. A system according to claim 1, including means electrically insulating each inner tube from said material, from said composition and from said outer tube.

7. A system according to claim 1, further including a composite wire electrode longitudinally slidably received within said bore to be feedable through said inner tube, said composite wire electrode including a tube having its bore filled with alloying material dispersed in a binder composition.

8. A system according to claim 1, further defined by said outer tube being of elliptical cross section, and a plurality of inner tubes, including said at least one inner tube, each being of circular cross section disposed within said elliptical outer tube.

9. A system according to claim 4, further defined by said outer tube being exteriorly coated with consumable flux material.

10. A system according to claim 7, further defined by said outer tube being exteriorly coated with asbestos material.

11. A system according to claim 8, further defined by said inner tubes being electrically insulated from said material and from said composition and from said outer tube, and said power supply including separate power sources of different potential and amperage values respectively electrically connected to said inner and outer tubes.

12. A system according to claim 8, further defined by a plurality of composite wire electrodes fed through said plurality of inner tubes, each of said wire electrodes including a tube having its bore filled with alloying material dispersed in a binder composition.

13. In an arc welding system having a power supply and a consumable guide tube having a welding wire fed therethrough, the improvement in said consumable guide tube comprising an electrically conductive outer tube electrically connected to said power supply, an electrically conductive inner tube disposed within said outer tube, defining a space therebetween and being electrically connected to said power supply, said inner tube having an internal freely open bore defining guide means for receiving and passing a consumable wire electrode from a storage station to a weld melt station, and consumable granular alloying material disposed within said space for addition to a weld melt.

* * * * *